United States Patent
Ben-Bassat

(10) Patent No.: US 10,341,611 B2
(45) Date of Patent: Jul. 2, 2019

(54) SYSTEM AND METHOD FOR VIDEO CONFERENCING

(71) Applicant: Inuitive Ltd., RaAnana (IL)

(72) Inventor: David Ben-Bassat, Ganei-Tikva (IL)

(73) Assignee: Inuitive Ltd., RaAnana (IL)

( * ) Notice: Subject to any disclaimer, the term of this patent is extended or adjusted under 35 U.S.C. 154(b) by 0 days.

(21) Appl. No.: 14/763,840

(22) PCT Filed: Apr. 29, 2014

(86) PCT No.: PCT/IL2014/050384
§ 371 (c)(1),
(2) Date: Jul. 28, 2015

(87) PCT Pub. No.: WO2014/178047
PCT Pub. Date: Nov. 6, 2014

(65) Prior Publication Data
US 2015/0365628 A1 Dec. 17, 2015

Related U.S. Application Data

(60) Provisional application No. 61/817,375, filed on Apr. 30, 2013.

(51) Int. Cl.
*G06F 3/01* (2006.01)
*G06K 9/60* (2006.01)
(Continued)

(52) U.S. Cl.
CPC ............. *H04N 7/15* (2013.01); *G06F 3/011* (2013.01); *G06F 3/012* (2013.01); *G06F 3/013* (2013.01);
(Continued)

(58) Field of Classification Search
None
See application file for complete search history.

(56) References Cited

U.S. PATENT DOCUMENTS 3,971,065 A 7/1976 Bayer
4,488,172 A 12/1984 Hutchin
(Continued)

FOREIGN PATENT DOCUMENTS

EP 1612733 1/2006
EP 2081097 7/2009
(Continued)

OTHER PUBLICATIONS

International Preliminary Report on Patentability Dated Sep. 11, 2015 From the International Bureau of WIPO Re. Application No. PCT/IL2014/050205.
(Continued)

*Primary Examiner* — Phung-Hoang J Nguyen

(57) ABSTRACT

A system for video conferencing is disclosed. The system comprises a data processor which receives from a remote location a stream of imagery data of a remote user, and displays an image of the remote user on a display device. The data processor also receives a stream of imagery data of an individual in a local scene in front of the display device, and extracts a gaze direction and/or a head orientation of the individual. The data processor varies a view of the image responsively to the gaze direction and/or the head orientation.

41 Claims, 2 Drawing Sheets

(51) Int. Cl.
  *H04N 7/14* (2006.01)
  *H04N 7/15* (2006.01)
  *H04N 13/376* (2018.01)

(52) U.S. Cl.
  CPC ............... *G06K 9/60* (2013.01); *H04N 7/14* (2013.01); *H04N 7/144* (2013.01); *H04N 13/376* (2018.05)

(56) References Cited

U.S. PATENT DOCUMENTS

| | | | |
|---|---|---|---|
| 4,979,815 | A | 12/1990 | Tsikos |
| 5,110,203 | A | 5/1992 | MacCabee |
| 5,255,313 | A | 10/1993 | Darbee |
| 5,499,303 | A | 3/1996 | Hundt et al. |
| 5,500,671 | A * | 3/1996 | Andersson ............ H04N 7/144 348/14.1 |
| 5,552,917 | A | 9/1996 | Darbee et al. |
| 5,703,677 | A | 12/1997 | Simoncelli et al. |
| 5,838,428 | A | 11/1998 | Pipitone et al. |
| 6,349,174 | B1 | 2/2002 | Ray et al. |
| 6,421,132 | B1 | 7/2002 | Brajovic |
| 6,456,793 | B1 | 9/2002 | Ray et al. |
| 6,504,479 | B1 | 1/2003 | Lemons et al. |
| 6,507,706 | B1 | 1/2003 | Brazas et al. |
| 6,584,283 | B2 | 6/2003 | Gabello et al. |
| 6,806,898 | B1 * | 10/2004 | Toyama ................ G06T 5/006 348/14.01 |
| 6,823,076 | B2 | 11/2004 | Cahill et al. |
| 6,856,382 | B2 | 2/2005 | Cahill et al. |
| 6,925,195 | B2 | 8/2005 | Cahill et al. |
| 6,937,742 | B2 | 8/2005 | Roberts et al. |
| 7,139,767 | B1 * | 11/2006 | Taylor ............... G06F 17/30244 |
| 7,194,112 | B2 | 3/2007 | Chen et al. |
| 7,576,847 | B2 | 8/2009 | Bridges |
| 7,583,777 | B2 | 9/2009 | Tang et al. |
| 7,613,356 | B2 | 11/2009 | Uchiyama |
| 8,077,914 | B1 | 12/2011 | Kaplan |
| 8,249,334 | B2 | 8/2012 | Berliner et al. |
| 8,395,656 | B1 * | 3/2013 | Malzbender ......... H04N 5/4403 348/14.08 |
| 8,434,868 | B2 | 5/2013 | Sato et al. |
| 8,510,166 | B2 | 8/2013 | Neven |
| 8,542,320 | B2 | 9/2013 | Berestov et al. |
| 8,553,936 | B2 | 10/2013 | Fogt |
| 9,041,915 | B2 * | 5/2015 | Earhart ................ G01S 3/7867 356/220 |
| 2002/0063957 | A1 * | 5/2002 | Kakizawa .......... G02B 27/2228 359/462 |
| 2003/0218672 | A1 * | 11/2003 | Zhang .................. H04N 7/144 348/14.16 |
| 2004/0019489 | A1 | 1/2004 | Funk et al. |
| 2005/0105759 | A1 | 5/2005 | Roberts et al. |
| 2005/0168402 | A1 * | 8/2005 | Culbertson ............ G06F 3/013 345/8 |
| 2005/0248651 | A1 * | 11/2005 | Hirata ..................... H04N 7/15 348/14.08 |
| 2005/0286737 | A1 | 12/2005 | Roberts et al. |
| 2006/0210045 | A1 * | 9/2006 | Valliath .................. H04N 7/147 379/202.01 |
| 2007/0024579 | A1 | 2/2007 | Rosenberg |
| 2008/0297589 | A1 * | 12/2008 | Kurtz .................... H04N 7/147 348/14.16 |
| 2008/0298795 | A1 | 12/2008 | Kuberka et al. |
| 2009/0231278 | A1 | 9/2009 | St. Hilaire et al. |
| 2010/0315329 | A1 * | 12/2010 | Previc .................. G06F 3/012 345/156 |
| 2011/0085018 | A1 * | 4/2011 | Culbertson ......... H04L 12/1827 348/14.08 |
| 2011/0103643 | A1 | 5/2011 | Salsman et al. |
| 2011/0273731 | A1 * | 11/2011 | Haikin .................. G06F 3/013 358/1.9 |
| 2012/0139816 | A1 * | 6/2012 | King .................... B60Q 9/00 345/7 |
| 2012/0147328 | A1 * | 6/2012 | Yahav .................... A61B 3/113 351/210 |
| 2012/0169838 | A1 * | 7/2012 | Sekine .................. H04N 7/144 348/14.16 |
| 2012/0183238 | A1 | 7/2012 | Savvides et al. |
| 2012/0224019 | A1 * | 9/2012 | Samadani ............ H04N 7/142 348/14.01 |
| 2012/0274736 | A1 * | 11/2012 | Robinson ................ H04N 7/15 348/14.16 |
| 2012/0294478 | A1 | 11/2012 | Publicover et al. |
| 2013/0070046 | A1 * | 3/2013 | Wolf ...................... H04N 7/144 348/14.16 |
| 2013/0107207 | A1 | 5/2013 | Zhao et al. |
| 2013/0147974 | A1 | 6/2013 | Ju et al. |
| 2014/0098179 | A1 * | 4/2014 | Moore ............... H04N 13/0014 348/14.08 |
| 2015/0163454 | A1 * | 6/2015 | Smith ................... H04N 7/157 348/14.07 |
| 2015/0220775 | A1 | 8/2015 | Nguyen et al. |
| 2015/0317516 | A1 | 11/2015 | Tsoref et al. |
| 2015/0341619 | A1 * | 11/2015 | Meir ...................... G01S 17/06 348/47 |
| 2015/0346701 | A1 | 12/2015 | Gordon et al. |
| 2016/0286209 | A1 * | 9/2016 | Dolim ................ H04N 13/0468 |

FOREIGN PATENT DOCUMENTS

| | | |
|---|---|---|
| EP | 2570079 | 3/2013 |
| WO | WO 99/06956 | 2/1999 |
| WO | WO 2007/043036 | 4/2007 |
| WO | WO 2008/141460 | 11/2008 |
| WO | WO 2012/154418 | 11/2012 |
| WO | WO 2013/07088 | 5/2013 |
| WO | WO 2013/066790 | 5/2013 |
| WO | WO 2014/087406 | 6/2014 |
| WO | WO 2014/132259 | 9/2014 |
| WO | WO 2014/178047 | 11/2014 |

OTHER PUBLICATIONS

International Preliminary Report on Patentability Dated Nov. 12, 2015 From the International Bureau of WIPO Re. Application No. PCT/IL2014/050384.

International Preliminary Report on Patentability Dated Jun. 18, 2015 From the International Bureau of WIPO Re. Application No. PCT/IL2013/050997.

International Search Report and the Written Opinion Dated Apr. 1, 2014 From the International Searching Authority Re. Application No. PCT/IL2013/050997.

International Search Report and the Written Opinion Dated Aug. 14, 2014 From the International Searching Authority Re. Application No. PCT/IL2014/050384.

International Search Report and the Written Opinion Dated Jun. 19, 2014 From the International Searching Authority Re. Application no. PCT/IL2014/050205.

Hattori et al. "Gesture Interpretation for Domestic Appliance Control", 18th International Conference on Artificial Reality and Telexistance 2008, ICAT 2008, Yokohama, Japan, Dec. 1-3, 2008, p. 343-346, Dec. 3, 2008.

Ji et al. "Real-Time Eye, Gaze, and Face Pose Tracking for Monitoring Driver Vigilance", Real-Time Imaging, 8: 357-377, 2002.

Official Action Dated Oct. 12, 2016 From the U.S. Appl. No. 14/649,218.

Official Action dated Jul. 26, 2017 From the US Patent and Trademark Office Re. U.S. Appl. No. 14/649,218. (16 pages).

Official Action dated May 18, 2018 From the US Patent and Trademark Office Re. U.S. Appl. No. 14/649,218. (13 pages).

Official Action dated Nov. 30, 2018 From the US Patent and Trademark Office Re. U.S. Appl. No. 14/649,218. (12 pages).

* cited by examiner

SYSTEM AND METHOD FOR VIDEO CONFERENCING

RELATED APPLICATIONS

This application is a National Phase of PCT Patent Application No. PCT/IL2014/050384 having International filing date of Apr. 29, 2014, which claims the benefit of priority under 35 USC §119(e) of U.S. Provisional Patent Application No. 61/817,375 filed on Apr. 30, 2013. The contents of the above applications are all incorporated by reference as if fully set forth herein in their entirety.

FIELD AND BACKGROUND OF THE INVENTION

The present invention, in some embodiments thereof, relates to the processing and displaying of image data and, more particularly, but not exclusively, to a system and method for video conferencing.

Videoconferencing has become a useful form of communication between parties for remotely conducting various forms of business, corporate meetings, training, and the like without traveling for face-to-face meetings. On a smaller or personal scale, videophone service or videotelephony enables individuals to communicate vocally and visually using special equipment.

It is well known that non-verbal messages form an important aspect of personal communication. It is a reason why people have a natural need to see the persons they talk to. The advent of low-cost webcams and the growing bandwidth for IP-traffic start to enable personal visual communication for people at home or in the office. A way to add impressiveness to the visual communication system, particularly give the users the impression to really be with the one they talk to, is adding a third spatial dimension to the visualization.

Inexpensive video cameras and microphones have been developed for interfacing to personal computers to enable vocal and visual communication over the Internet. Web cameras or webcams can be attached to liquid crystal display (LCD) monitors, directed at the user, and interfaced to the computer for acquiring live images of the user. A microphone mounted on a desk or the monitor is connected to a microphone input of the computer to receive the user's voice input. Many portable computer devices such as laptops, notebooks, netbooks, tablet computers, pad computers, and the like are provided with built-in video cameras and microphones. Most cellular or cell phones also have cameras capable of recording still or moving images. Such cameras and microphones allow computer users to engage in an informal kind of vocal and visual communication over the Internet, which is sometimes referred to as "video chatting".

SUMMARY OF THE INVENTION

According to an aspect of some embodiments of the present invention there is provided a system for video conferencing. The system comprises a data processor configured for receiving from a remote location a stream of imagery data of a remote user; displaying an image of the remote user on a display device; receiving a stream of imagery data of an individual in a local scene in front of the display device; extracting a to gaze direction and/or the head orientation of the individual; and varying a view of the image responsively to the gaze direction and/or the head orientation.

According to some embodiments of the invention the invention the system comprises the display device, and an imaging system constituted to receive a view of the local scene and transmit a stream of imagery data of the local scene to the data processor.

According to some embodiments of the invention the imaging system is configured for capturing a video stream and range data.

According to some embodiments of the invention the imaging system is configured for capturing stereoscopic image data.

According to some embodiments of the invention the data processor is configured for calculating range data from the stereoscopic image data.

According to some embodiments of the invention the invention the system comprises a light source configured for projecting a light beam onto the individual, wherein the data processor is configured for calculating range data by a time-of-flight technique.

According to some embodiments of the invention the invention the system comprises a light source configured for projecting a light pattern onto the individual, wherein the data processor system is configured for calculating range data by a triangulation technique, such as, but not limited to, a structured light technique.

According to some embodiments of the invention the stream of imagery data of the remote user comprises a video stream and range data, wherein the data processor is configured for reconstructing a three-dimensional image from the stream of imagery data and displaying the three-dimensional image on the display device.

According to some embodiments of the invention the variation of the view comprises varying a displayed orientation of the remote user such that a rate of change of the orientation matches a rate of change of the gaze direction and/or head orientation.

According to some embodiments of the invention the variation of the view comprises varying a displayed orientation of the remote user oppositely to a change of the gaze direction and/or the head orientation.

According to some embodiments of the invention the variation of the view to comprises maintaining a fixed orientation of the remote user relative to the gaze direction.

According to some embodiments of the invention the system comprises at least one infrared light source constituted for illuminating at least a portion of the local scene, wherein the stream of imagery data of the individual comprises image data received from the individual in the visible range and in the infrared range.

According to an aspect of some embodiments of the present invention there is provided a system for at least two-way video conferencing between at least a first party at a first location and a second party at a second location. The system comprises a first system at the first location and a second system at the second location, each of the first and the second systems being the system as delineated above and optionally as further detailed hereinunder.

According to an aspect of some embodiments of the present invention there is provided a method of video conferencing. The method comprises: receiving from a remote location a stream the individual of a remote user; displaying an image of the remote user on a display device; using an imaging system for capturing a stream the individual of an individual in a local scene in front of the display device; and using a data processor for extracting a gaze direction and/or the head orientation of the individual, and varying a view of the image responsively to the gaze direction and/or the head orientation.

According to some embodiments of the invention the capturing of the stream of imagery data comprises capturing a video stream and range data.

According to some embodiments of the invention the capturing of stream of imagery data comprises capturing stereoscopic image data. According to some embodiments of the invention the method comprises calculating range data from the stereoscopic image data.

According to some embodiments of the invention the method comprises projecting a light beam onto the individual, and calculating the range data by a time-of-flight technique.

According to some embodiments of the invention the method comprises projecting a light pattern onto the individual, and calculating the range data by a triangulation technique, such as, but not limited to, a structured light technique.

According to some embodiments of the invention the stream of imagery data of the remote user comprises a video stream and range data, and the method comprises reconstructing a three-dimensional image from the stream of imagery data and displaying the three-dimensional image on the display device.

According to some embodiments of the invention the method comprises varying a displayed orientation of the remote user such that a rate of change of the orientation matches a rate of change of the gaze direction and/or the head orientation.

According to some embodiments of the invention the method comprises varying a displayed orientation of the remote user oppositely to a change of the gaze direction and/or the head orientation.

According to some embodiments of the invention the method comprises maintaining a fixed orientation of the remote user relative to the gaze direction.

According to some embodiments of the invention the method comprises illuminating at least a portion of the local scene by infrared light, wherein the capturing of the stream of imagery data of the individual comprises imaging the individual in the visible range and in the infrared range.

According to an aspect of some embodiments of the present invention there is provided a computer software product. The computer software product comprises a computer-readable medium in which program instructions are stored, which instructions, when read by a data processor, cause the data processor to receive a video stream of a remote user and a video stream of an individual in a local scene, and to execute the method as delineated above and optionally as further detailed hereinunder.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a to combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
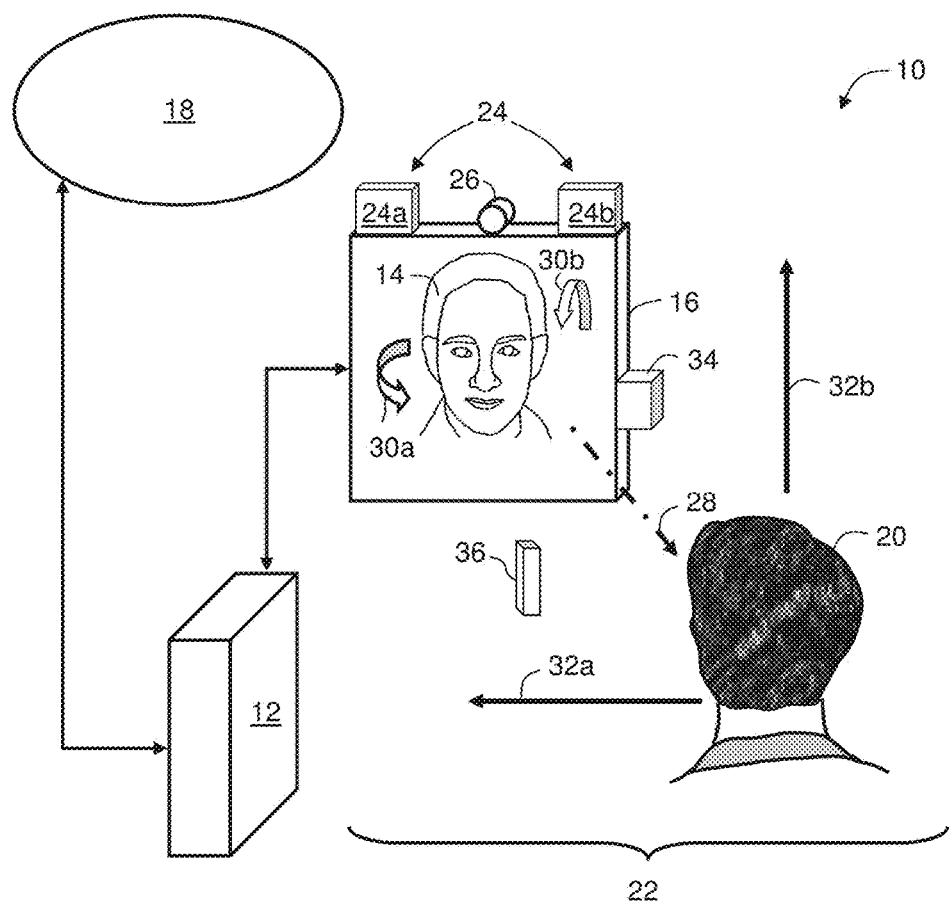
FIG. 1 is a schematic illustration of a system for video conferencing, according to some embodiments of the present invention.

The present invention, in some embodiments thereof, relates to the processing and displaying of image data and, more particularly, but not exclusively, to a system and method for video conferencing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a system 10 for video conferencing, according to some embodiments of the present invention.

System 10 comprises a data processor 12 configured for receiving from a remote location (not shown) a stream of imagery data of a remote user in a remote scene. For example, the stream (referred to below as the remote stream) can be broadcasted over a communication network 18 (e.g., a local area network, or a wide area network such as the Internet or a cellular network), and data processor 12 can be configured to communicate with network 18, and receive the remote stream therefrom. In various exemplary embodiments of the invention data processor 12 also receives from the remote location an audio stream (referred to be low as the remote audio stream) accompanying the imagery data stream.

As used herein "imagery data" refers to a plurality of values that represent a two- or three-dimensional image, and that can therefore be used to reconstruct a two- or three-dimensional image.

Typically, the imagery data comprise values (e.g., grey-levels, intensities, color intensities, etc.), each corresponding to a picture-element (e.g., a pixel, a sub-pixel or a group of pixels) in the image. In some embodiments of the present invention, the imagery data also comprise range data as further detailed hereinbelow.

As used herein "stream of imagery data" or "imagery data stream" refers to time-dependent imagery data, wherein the plurality of values varies with time.

Typically, the stream of imagery data comprises a video stream which may include a plurality of time-dependent values (e.g., grey-levels, intensities, color intensities, etc.), wherein a particular value at a particular time-point corresponds to a picture-element (e.g., a pixel, a sub-pixel or a group of pixels) in a video frame. In some embodiments of the present invention, the stream of imagery data also comprises time-dependent range data.

In various exemplary embodiments of the invention the remote imagery data stream comprises a video stream, referred to herein as the remote video stream. Data processor 12 is preferably configured for decoding the remote video stream such that it can be interpreted and properly displayed. Data processor 12 is preferably configured to support a number of known codecs, such as MPEG-2, MPEG-4, H.264, H.263+, or other codec's. Data processor 12 uses the remote video stream for displaying a video image 14 of the remote user on a display device 16. In various exemplary embodiments of the invention system 10 also comprises display device 16.

Data processor 12 can decode the remote audio stream such that it can be interpreted and properly output. If the remote audio stream is compressed, data processor preferably decompresses it. Data processor 12 is preferably configured to support a number of known audio codecs. Data processor 12 transmits the decoded remote audio stream to an audio output device 34, such as, but not limited to, a speaker, a headset and the like. In various exemplary embodiments of the invention system 10 comprises audio output device 36.

Data processor 12 can be any man-made machine capable of executing an instruction set and/or performing calculations. Representative examples including, without limitation, a general purpose computer supplemented by dedicated software, general purpose microprocessor supplemented by dedicated software, general purpose microcontroller supplemented by dedicated software, general purpose graphics processor supplemented by dedicated software and/or a digital signal processor (DSP) supplemented by dedicated software. Data processor can also comprise dedicated circuitry (e.g., a printed circuit board) and/or a programmable electronic chip into which dedicated software is burned.

In various exemplary embodiments of the invention the stream of imagery data comprises range data corresponding to the video stream, wherein both the video stream to and the range data are time dependent and synchronized, such that each video frame of the video stream has a corresponding set of range data.

The range data describe topographical information of the remote user or remote scene and is optionally and preferably received in the form of a depth map.

The term "depth map," as used herein, refers to a representation of a scene (the remote scene, in the present example) as a two-dimensional matrix, in which each matrix element corresponds to a respective location in the scene and has a respective matrix element value indicative of the distance from a certain reference location to the respective scene location. The reference location is typically static and the same for all matrix elements. A depth map optionally and preferably has the form of an image in which the pixel values indicate depth information. By way of example, an 8-bit grey-scale image can be used to represent depth information. The depth map can provide depth information on a per-pixel basis of the image data, but may also use a coarser granularity, such as a lower resolution depth map wherein each matrix element value provides depth information for a group of pixels of the image data.

The range data can also be provided in the form of a disparity map. A disparity map refers to the apparent shift of objects or parts of objects in a scene (the remote scene, in the present example) when observed from two different viewpoints, such as from the left-eye and the right-eye viewpoint. Disparity map and depth map are related and can be mapped onto one another provided the geometry of the respective viewpoints of the disparity map are known, as is commonly known to those skilled in the art.

When the remote stream of imagery data includes a video stream as well as range data, data processor 12 reconstructs a three-dimensional image of the remote user from the imagery data and displays a view of the three-dimensional image 14 on display device 16.

The three-dimensional image comprises geometric properties of a non-planar surface which at least partially encloses a three-dimensional volume. Generally, the non-planar surface is a two-dimensional object embedded in a three-dimensional space.

Formally, a non-planar surface is a metric space induced by a smooth connected and compact Riemannian 2-manifold. Ideally, the geometric properties of the non-planar surface would be provided explicitly for example, the slope and curvature (or even other spatial derivatives or combinations thereof) for every point of the non-planar surface. to Yet, such information is rarely attainable and the spatial information of the three-dimensional image is provided for a sampled version of the non-planar surface, which is a set of points on the Riemannian 2-manifold and which is sufficient for describing the topology of the 2-manifold. Typically, the spatial information of the non-planar surface is a reduced version of a 3D spatial representation, which may be either a point-cloud or a 3D reconstruction (e.g., a polygonal mesh or a curvilinear mesh) based on the point cloud. The 3D image is expressed via a 3D coordinate system, such as, but not limited to, Cartesian, Spherical, Ellipsoidal, 3D Parabolic or Paraboloidal coordinate 3D system.

It is appreciated that a three-dimensional image of an object is typically a two-dimensional image which, in addition to indicating the lateral extent of object members, further indicates the relative or absolute distance of the object members, or portions thereof, from some reference point, such as the location of the imaging device. Thus, a three-dimensional image typically includes information residing on a non-planar surface of a three-dimensional body and not necessarily in the bulk. Yet, it is commonly acceptable to refer to such image as "three-dimensional" because the non-planar surface is conveniently defined over a three-dimensional system of coordinate. Thus, throughout this specification and in the claims section that follows, the term "three-dimensional image" primarily relate to surface entities.

In order to improve the quality of the reconstructed three-dimensional image, additional occlusion information, known in the art as de-occlusion information, can be provided. (De-)occlusion information relates to image and/or depth information which can be used to represent views for additional viewpoints (e.g., other than those used for generating the disparity map). In addition to the information that was occluded by objects, the occlusion information may also comprise information in the vicinity of occluded regions. The availability of occlusion information enables filling in of holes which occur when reconstructing the three-dimensional image using a 2D+range data.

Occlusion data can be generated by data processor 12 and/or the remote location. When the occlusion data are generated at the remote location, it is optionally and preferably also transmitted over communication network and received by data processor 12. When the occlusion data is generated by data processor 12, it can be approximated using the range data, optionally and preferably from visible background for occlusion areas. Receiving the occlusion data from the remote location is preferred from the standpoint of quality, and generating the occlusion data by processor 12 is preferred from the standpoint of reduced amount of transferred data.

The reconstruction of three-dimensional image using the image and range data and optionally also occlusion data can be done using any procedure known in the art. Representative examples of suitable algorithms are found in Qingxiong Yang, "Spatial-Depth Super Resolution for Range Images," IEEE Conference on Computer Vision and Pattern Recognition, 2007, pages 1-8; H. Hirschmuller, "Stereo Processing by Semiglobal Matching and Mutual Information," IEEE Transactions on Pattern Analysis and Machine Intelligence, 2008, 30(2):328-341; International Publication No. WO1999/006956; European Publication Nos. EP1612733 and EP2570079; U.S. Published Application Nos. 20120183238 and 20120306876; and U.S. Pat. Nos. 7,583,777 and 8,249,334, the contents of which are hereby incorporated by reference.

In various exemplary embodiments of the invention data processor 12 also receives a stream of imagery data of an individual 20 in a local scene 22 in front of display device. Local scene 22 may also include other objects (e.g., a table, a chair, walls, etc.) which are not shown for clarity of presentation. The imagery data stream of an individual 20 is referred to herein as the local imagery data stream. The imagery data stream is generated by an imaging system 24 constituted to capture a view of local scene 22 and transmit a corresponding imagery data to data processor 12.

The local imagery data preferably comprises a video stream, referred to herein as the local video stream. Data processor 12 preferably encodes the video stream received from imaging system 24 in accordance with a known codec, such as MPEG-2, MPEG-4, H.264, H.263+, or other codecs suitable for video conferencing. In some embodiments of the present invention data processor 12 also compress the encoded video for transmission. Data processor preferably transmits the local video stream over communication network 18 to the remote location. In various exemplary embodiments of the invention system 10 comprises imaging system 24.

In various exemplary embodiments of the invention data processor 12 additionally receives an audio stream from individual 20 and/or scene 22, which audio stream is accompanying the video stream. The audio stream received from individual 20 and/or scene 22 is referred to herein as the remote audio stream. The local audio stream can be captured by an audio pickup device 36, such as, but not limited to, a microphone, a microphone array, a headset or the like, which transmits the audio stream to data processor 12. If the audio stream is analogue, data processor 12 preferably digitizes the audio stream. Data processor 12 is optionally and preferably configured for encoding and optionally compressing the audio data in accordance with a known codec and compression protocols suitable for video conferencing. Following audio processing, data processor 12 transmits the audio stream over communication network 18 to the remote location. In various exemplary embodiments of the invention system 10 comprises audio pickup device 36.

Imaging system 24, display device 16, audio output device 34, audio pickup device 36, and data processor 12 may be integrated into system 10, or may be separate components that can be interchanged or replaced. For example, imaging system 24, display device 16, audio output device 34 and audio pickup device 36 may be part of a laptop computer or dedicated video conferencing system. Alternatively, imaging system 24 can connect to data processor 12 via USB, FireWire, Bluetooth, Wi-Fi, or any other connection type. Similarly, display device 16 may connect to data processor 16 using an appropriate connection mechanism, for example and without limitation, HDMI, DisplayPort, composite video, component video, S-Video, DVI, or VGA. Audio devices 34 and 36, may connect to data processor 12 via USB, an XLR connector, a ¼" connector, a 3.5 mm connector or the like.

Imaging system 24 is optionally and preferably configured for capturing the video stream and range data. The range data can be of any type described above with respect to the range data received from the remote location. Optionally, the range data also comprises occlusion data.

Range data can be captured by imaging system 24 in more than one way.

In some embodiments of the present invention imaging system 24 is configured for capturing stereoscopic image data, for example, by capturing scene 22 from two or more different view points. Thus, in various exemplary embodiments of the invention imaging system 24 comprises a plurality of spaced apart imaging sensors. Shown in FIG. 1 are two imaging sensors 24a and 24b, but it is not intended to limit the scope of the present invention to a system with two imaging sensors. Thus, the present embodiments contemplate configurations with one imaging sensor or more than two (e.g., 3, 4, 5 or more) imaging sensors.

From the stereoscopic image data, data processor optionally and preferably calculates range data. The calculated range data can be in the form of a depth map and/or a disparity map, as further detailed hereinabove. Optionally, data processor also calculates occlusion data. In some embodiments, imaging system 24 capture scene 22 from three or more viewpoints so as to allow data processor to calculate the occlusion data in higher precision.

In various exemplary embodiments of the invention at least one of the imaging sensors of system 24 is configured to provide a field-of-view of scene 22 or a part thereof over a spectral range from infrared to visible light. Preferably, at least one, more preferably, all the imaging sensors comprise a pixelated imager, such as, but not limited to, a CCD or CMOS matrix, which is devoid of IR CUT filter and which therefore generates a signal in response to light at any wavelength within the visible range and any wavelength within the IR range, more preferably the near IR range.

Representative examples of a characteristic wavelength range detectable by the imaging sensors include, without limitation, any wavelength from about 400 nm to about 1100 nm, or any wavelength from about 400 nm to about 1000 nm. In some embodiments of the present invention the imaging devices also provide signal responsively to light at the ultraviolet (UV) range. In these embodiments, the characteristic wavelength range detectable by the imaging devices can be from about 300 nm to about 1100 nm. Other characteristic wavelength ranges are not excluded from the scope of the present invention.

As used herein the term "about" refers to ±10%.

The imaging sensors optionally and preferably provide partially overlapping field-of-views of scene 22. The overlap between the field-of-views allows data processor 12 to combine the field-of-views. In various exemplary embodiments of the invention the spacing between the imaging sensors is selected to allow data processor 12 to provide a three-dimensional reconstruction of individual 20 and optionally other objects in scene 22.

In some embodiments of the present invention system 10 comprises one or more light sources 26 constituted for illuminating at least part of scene 22. Shown in FIG. 1 is one light source, but it is not intended to limit the scope of the present invention to a to system with one light source. Thus, the present embodiments contemplate configurations with two light sources or more than two (e.g., 3, 4, 5 or more) light sources. Herein, unless explicitly stated, a reference to light sources in the plural form should be construed as a reference to one or more light sources.

The light source can be of any type known in the art, including, without limitation, light emitting diode (LED) and a laser device.

One or more of light sources 26 optionally and preferably emits infrared light. In these embodiments, the infrared light sources generate infrared light at a wavelength detectable by the imaging sensors. The infrared light sources are optionally and preferably positioned adjacent to the imaging sensors, this need not necessarily be the case, since, for some applications, it may not be necessary for the light sources to be adjacent to the imaging sensors.

The light sources can provide infrared illumination in more than one way. In some embodiments of the present invention one or more of the light sources provide flood illumination, and in some embodiments of the present invention one or more of the light sources generates an infrared pattern.

As used herein, "flood illumination" refers to illumination which is spatially continuous over an area that is illuminated by the illumination.

Flood illumination is useful, for example, when scene 22 is at low ambient light conditions, and it is desired to increase the amount of light reflected back from the scene in the direction of the imaging device.

As used herein, "infrared pattern" refers to infrared illumination which is non-continuous and non-uniform in intensity over at least a central part of the area that is illuminated by the illumination.

Infrared pattern is useful, for example, when it is desired to add identifiable features to the scene. The pattern typically includes a plurality of distinct features at horizontal and vertical angular resolutions of from about 0.2° to about 2° or from about 0.5° to about 1.5°, e.g., about 1°. In computer vision applications employing a CMOS imager, horizontal and vertical angular views of 1° each typically corresponds to about 20×20 pixels of the imager.

The present embodiments also contemplate one or more light sources which illuminate the local scene with a pattern in the visible range.

Optionally, the pattern varies with time. For example, a series of patterns can be projected, one pattern at a time, in a rapid and periodic manner. This can be done in any of a number of ways. For example, a plate having a periodically varying transmission coefficient can be moved in front of an illuminating device. Alternatively, a disk having a circumferentially varying transmission coefficient can be rotated in front of the illuminating device. Still alternatively, strobing technique can be employed to rapidly project a series of stationary patterns, phase shifted with respect to each other. Also contemplated is the use of optical diffractive elements for forming the pattern.

In some embodiments of the present invention one or more of the light sources are used to illuminate local scene 22, particularly individual 20, by visible, infrared or ultraviolet light so as to allow processor 12 or imaging system 24 to calculate the range data using a time-of-flight (TOF) technique. In these embodiments, the respective light sources are configured for emitting light with intensity that varies with time.

The TOF technique can be employed, for example, using a phase-shift technique or pulse technique.

With the phase-shift technique, the amplitude of the emitted light is periodically modulated (e.g., by sinusoidal modulation) and the phase of the modulation at emission is compared to the phase of the modulation at reception. The modulation period is optionally and preferably in the order of twice the difference between the maximum measurement distance and the minimum measurement distance divided by the velocity of light, and the propagation time interval can be determined as phase difference.

With the pulse technique, light is emitted in discrete pulses without the requirement of periodicity. For each emitted pulse of light the time elapsed for the reflection to return is measured, and the range calculated as one-half the product of round-trip time and the velocity of the signal.

In some embodiments, data processor 12 or imaging system 24 calculates the range data based on a triangulation technique, such as, but not limited to, a structured light technique. In these embodiments, one or more of light sources 26 projects a light pattern in the visible, infrared or ultraviolet range onto scene 22, particularly individual 20. An image of the reflected light pattern is captured by an imaging sensor (e.g., imaging sensor 24a) and the range data are calculated by data processor or imaging system 24 based on the spacings and/or distortions associated with the reflected light pattern relative to the projected light pattern. Preferably, the light pattern is invisible to the naked eye (e.g., in the infrared or ultraviolet range) so that when the remote user is presented with an image of individual 20, the projected pattern does not obstruct or otherwise interfere with the presented image. Representative examples of patterns suitable for calculating of range data using the structured light technique including, without limitation, a single dot, a single line, and two-dimensional pattern (e.g., horizontal and vertical lines, checkerboard pattern, etc.). The light from light source 36 can scan individual 20 and the process is repeated for each of a plurality projection directions.

Additional techniques for calculating range data suitable for the present embodiments are described in, e.g., S. Inokuchi, K. Sato, and F. Matsuda, "Range imaging system for 3D object recognition", in Proceedings of the International Conference on Pattern Recognition, pages 806-808, 1984; U.S. Pat. Nos. 4,488,172, 4,979,815, 5,110,203, 5,703,677, 5,838,428, 6,349,174, 6,421,132, 6,456,793, 6,507,706, 6,584,283, 6,823,076, 6,856,382, 6,925,195 and 7,194,112; and International Publication No. WO 2007/043036, the contents of which are hereby incorporated by reference.

In some embodiments of the present invention data processor 12 extracts a gaze direction 28 of individual 20, and varies the image 14 of the remote user on display device 16 responsively to the gaze direction.

As used herein, "gaze direction" refers to the direction of a predetermined identifiable point or a predetermined set of identifiable points on individual 20 relative to display device 16 or relative to imaging system 24. Typically, but not necessarily, gaze direction 28 is the direction of an eye or a nose of individual 20 relative to display device 16.

In some embodiments of the present invention data processor 12 also extracts a head orientation of individual 20, wherein data processor 12 varies the image 14 of the remote user on display device 16 responsively to the head orientation.

In various exemplary embodiments of the invention image 14 is varied by to rotating the view of image 14 such that the remote user is displayed as if viewed from a different perspective. The rotation can be about any axis of rotation, preferably, but not necessarily, an axis of rotation that is parallel to the plane of display device 16. Rotation about an axis of rotation that is perpendicular to the plane of display device 16 is not excluded from the scope of the present invention.

The orientation of image 14 is optionally and preferably varied by data processor 12 such that a rate of change of the orientation of image 14 matches a rate of change of gaze direction 28 and/or the head orientation.

In some embodiments of the present invention, data processor 12 varies the displayed orientation of the remote user oppositely to the change of gaze direction 28, and/or the head orientation. It was found by the present inventors that such synchronization between the change in the gaze direction 28 and/or the head orientation and the change in the displayed orientation of the remote user mimics a three-dimensional reality for individual 20 while looking at image 14. Thus, while individual 20 moves his or her head relative to display device 16, image 14 is rotated in the opposite direction, such that individual 20 is provided with a different view of the remote user, as if the remote user were physically present in scene 22.

In the representative illustration of FIG. 1, which is not to be considered is limiting, two possible motion paths 32a and 32b of individual 20 and two possible rotation directions 30a and 30b of the view of image 14 are shown. Motion path 32a is horizontal from right to left, motion path 32b is vertical from a lower to a higher position, rotation direction 30a is anticlockwise with a rotation axis pointing downwards (negative yaw), and rotation direction 30b is clockwise with a rotation axis pointing rightwards (negative pitch). When it is desired to mimic a three-dimensional reality, a motion of individual 20 along path 32a is preferably accompanied by rotation of image 14 along rotation direction 30a, a motion of individual 20 along path 32b is preferably accompanied by rotation of image 14 along rotation direction 30b, a motion of individual 20 along a path opposite to 32a is preferably accompanied by rotation of image 14 along a direction opposite to rotation direction 30a, and a motion of individual 20 along a path opposite to 32b is preferably accompanied by rotation of image 14 along a direction opposite to rotation 30b.

Also contemplated, are embodiments in which data processor 12 varies the to displayed orientation of the remote user so as to maintain a fixed orientation of the remote user relative to gaze direction 28 and/or the head orientation. For example, the displayed orientation can be rotated such that the gaze of the remote user follows the location of individual 20. Thus, when a fixed relative orientation of the remote user is desired, a motion of individual 20 along path 32a is preferably accompanied by rotation of image 14 along a rotation direction opposite to direction 30a, a motion of individual 20 along path 32b is preferably accompanied by rotation of image 14 along a rotation direction opposite to direction 30b, a motion of individual 20 along a path opposite to 32a is preferably accompanied by rotation of image 14 along rotation direction 30a, and a motion of individual 20 along a path opposite to 32b is preferably accompanied by rotation of image 14 along rotation direction 30b.

It is appreciated that any motion path of individual 20 can be expressed as a linear combination of directions 32a and 32b. The ordinarily skilled person would know how to adjust the above description for the case of such motion path.

While the embodiments above are described with a particular emphasis to rotations that are opposite to the change in the gaze direction and to rotations that maintain fixed relative orientation of image 14, it is to be understood that more detailed reference to these rotations is not to be interpreted as limiting the scope of the invention in any way. Thus, some embodiments of the present invention contemplate any relation between the variation of the view of image 14 and the change in gaze direction 28 and/or the head orientation. Furthermore while the embodiments above are described with a particular emphasis to variations realized by rotations about axes that are parallel to the plane of imaging device 16 (the yaw and/or pitch axes), it is to be understood that more detailed reference to these variations is not to be interpreted as limiting the scope of the invention in any way. Thus, some embodiments of the present invention contemplate any variation of the view of image 14, including rotations about an axis perpendicular to the plane of display device 16 (the roll axis), and translation of image 14 across display device 16).

The gaze direction and/or the head orientation can be extracted by processing the images in the local imagery data stream using any technique known in the art, either for a two-dimensional or for or a three-dimensional image of individual 20.

For example, in some embodiments of the present invention data processor 12 employs an eye-tracking procedure for tracking the eyes of the individual as known in the art, and then determines the gaze direction and/or the head orientation based on the position of the eyes on the image. As a representative example for an eye-tracking procedure, the corners of one or more of the eyes can be detected, e.g., as described in Everingham et al. [In BMVC, 2006], the contents of which are hereby incorporated by reference. Following such detection, each eye can be defined as a region between two identified corners. Additional eye-tracking techniques are found, for example, in U.S. Pat. Nos. 6,526,159 and 8,342,687; European publication Nos. EP1403680, EP0596868, International Publication No. WO1999/027412, the contents of which are hereby incorporated by reference.

Also contemplated are other face recognition techniques that use geometrical characteristics of a face, to identify facial features in the face of individual 20, including, without limitation, the tip of the nose, the nostrils, the mouth corners, and the ears. Once these facial features are identified, data processor 12 determines the gaze direction and/or the head orientation based on the position of the identified facial features on the image. Techniques for the identification of facial features in an image are now in the art and are found, for example, in U.S. Pat. No. 8,369,586, European Publication Nos. EP1296279, EP1693782, and International Publication No. WO1999/053443, the contents of which are hereby incorporated by reference.

When data processor 12 generates range data of individual 20, the range data can be used to aid the extraction of gaze and/or the head orientation information. For example, the nose of individual 20 can be identified based on the range data associated with the face of individual 20. Specifically, the region in the range data of the face that has the shortest distance to imaging system 24 can be identified as the nose. Once the nose is identified, data processor 12 determines the gaze direction and/or the head orientation based on the position of the nose on the image.

Two or more systems such as system 10 can be deployed at respective two or more locations and be configured to communicate with each other over communication network 18.

For example, the present embodiments contemplate a system for two-way video conferencing between a first party at a first location and a second party as a second location, wherein each of the two locations is a remote location with respect to the other location. The two-way video conferencing system can include a first system at the first location and a second system at the second location, wherein each of the first and second systems comprises system 10. Thus, for the first system, the first party is the individual in the local scene whose gaze direction and/or head orientation is determined, and the second party (at the second location) is the remote user whose image is displayed and varied on the display device; for the second system, the second party is the individual in the local scene whose gaze direction and/or head orientation is determined, and the first party (at the first location) is the remote user whose image is displayed and varied on the display device.

It is to be understood that it is not intended to limit the scope of the present invention to a two-way videoconferencing system. The present embodiments contemplate N-way videoconferencing system for allowing videoconference among N parties at respective N locations, wherein each one of the N locations is a remote location with respect to another one of the N locations. In these embodiments, a system such as system 10 is deployed at each of the N locations. One of ordinary skills in the art, provided with the details described herein would know how to deploy N systems like system 10 to respectively operate at N different locations.

For example, a party at a particular location of the N locations can be presented with a view of two or more other parties (e.g., of all other N−1 parties) on the respective display device, in a so called "virtual conference room." The virtual conference room can include, in addition to the images of the other parties, three-dimensional models of computer graphics representing, for example, a table and the inside of the conference room. When the gaze and/or head orientation of the party at the particular location is changed, the data processor of the system at the particular location varies the view (e.g., rotates) of the virtual conference room and/or the parties that is/are displayed on the device. Preferably, when each party is arranged at its respective position in the virtual conference room, each party sees the virtual conference room from a location at which the party is arranged. Accordingly, the image of the virtual conference room which is viewed by each party on its display is different among the different display devices.

Figure 2:
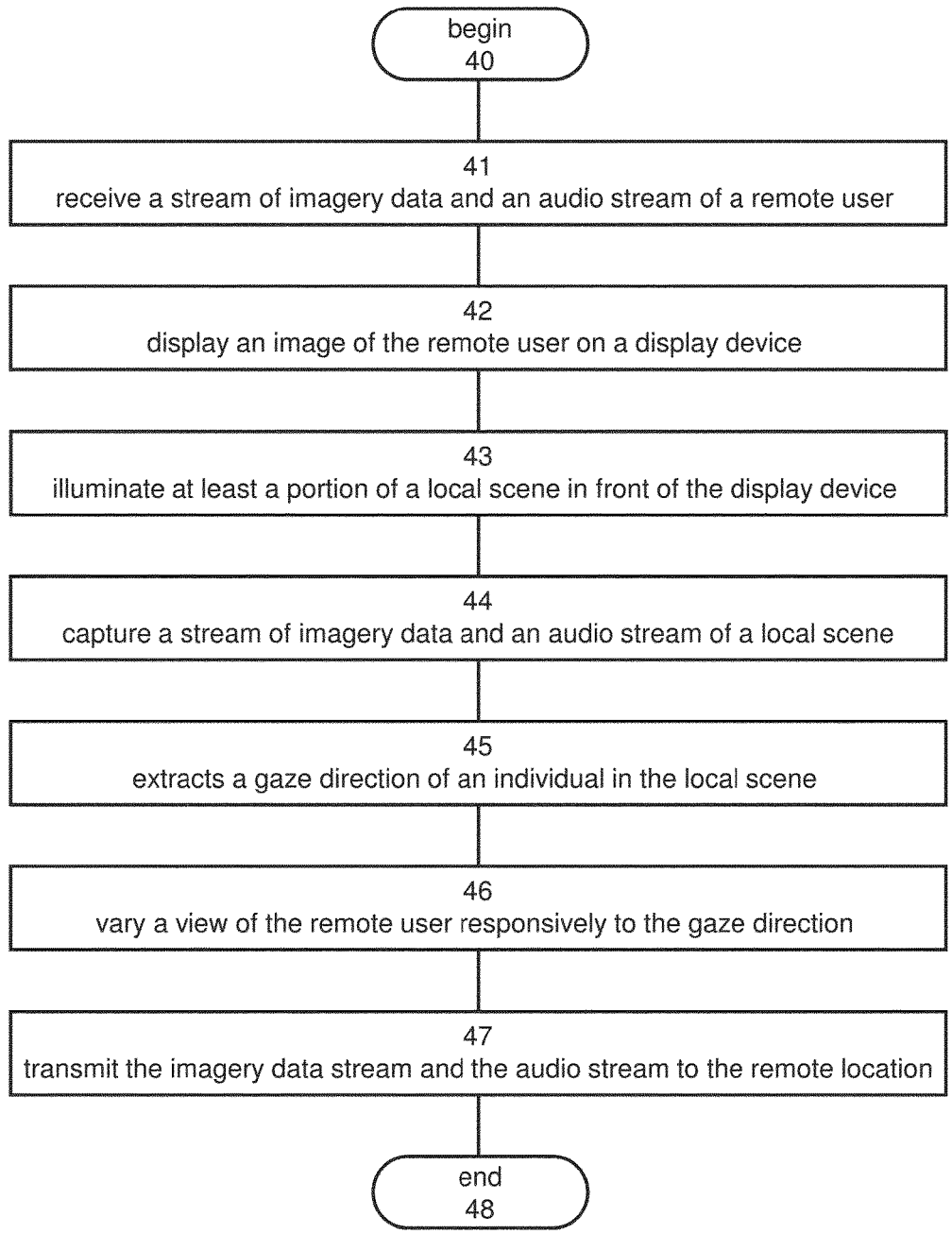
FIG. 2 is a flowchart diagram of a method suitable for video conferencing, according to some embodiments of the present invention.

Reference is now made to FIG. 2 which is a flowchart diagram of a method suitable for video conferencing, according to some embodiments of the present invention. At least some operations of the method can be executed by a data processor, to e.g., data processor 12, and at least some operations of the method can be executed by an imaging system, e.g., imaging system 24.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method can be embodied in many forms. For example, it can be embodied in on a tangible medium such as a computer for performing the method operations. It can be embodied on a computer readable medium, comprising computer readable instructions for carrying out at least some of the method operations. In can also be embodied in electronic device having digital computer capabilities arranged to run the computer program on the tangible medium or execute the instruction on a computer readable medium.

The method begins at 40. At 41 the method receives from a remote location a stream imagery data of a remote user, and at 42 the method displays an image of the remote user on a display device, as further detailed hereinabove. In various exemplary embodiments of the invention, the method decodes and/or decompresses the video data before the image is displayed. In some embodiments of the present invention the imagery data stream of the remote user comprises a video stream and range data, and the method reconstructs a three-dimensional image from the data and displays the three-dimensional image on the display device, as further detailed hereinabove. In some embodiments, the method also receives from the remote location an audio stream accompanying the video stream, and transmits the audio stream to an audio output device, as further detailed hereinabove. In various exemplary embodiments of the invention, the method decodes and/or decompresses the audio data before the image is displayed.

At 43 the method optionally illuminates at least a portion of a local scene in front of the display device, for example, by visible and/or infrared light. to At 44, an imaging system, such as imaging system 24, is used for capturing a stream or imagery data of an individual in the local scene. In some embodiments of the present invention the method captures a video stream and range data, as further detailed hereinabove. When the scene is illuminated by infrared light, the method optionally and preferably captures imaging data in the visible range and in the infrared range.

In various exemplary embodiments of the invention the method receives an audio stream from the individual and/or local scene, and transmits the audio stream to the remote location. Optionally and preferably the method digitizes, encodes and/or compresses the audio stream prior to its transmission.

At 45 the method extracts a gaze direction and/or the head orientation of the individual using a data processor, and at 46 the method varies a view of the image of the remote user responsively to the gaze direction and/or the head orientation, as further detailed hereinabove. The variation optionally and preferably comprises varying a displayed orientation of the remote user such that a rate of change of the orientation matches a rate of change of the gaze direction and/or the head orientation. In some embodiments of the present invention the displayed orientation of the remote user is rotated oppositely to a change of the gaze direction and/or the head orientation, and in some embodiments of the present invention a fixed orientation of the remote user relative to the gaze direction is maintained.

At 47 the method optionally and preferably transmits the imagery data of the individual to the remote location. When range data is captured, the method preferably transmits also the range data, optionally and preferably in the form of a depth map, to the remote location.

The method ends at 48.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for video conferencing, comprising:
    a data processor configured for receiving from a remote location a stream of imagery data of a remote user and displaying an image of said remote user on a display device, receiving a stream of imagery data of an individual in a local scene in front of said display device, extracting a head orientation of said individual, and varying a view of said image responsively to said head orientation;
    wherein said variation of said view comprises varying a displayed orientation of said remote user such that a rate of change of said orientation matches a rate of change of said head orientation;
    wherein said stream of imagery data comprises range data in a form of a depth map providing depth information at a lower resolution for a group of pixels of the image data.

2. The system according to claim 1, further comprising, said display device, and an imaging system constituted to receive a view of said local scene and transmit a stream of imagery data of said local scene to said data processor.

3. The system according to claim 2, wherein said imaging system is configured for capturing a video stream and range data.

4. The system according to claim 2, wherein said imaging system is configured for capturing stereoscopic image data.

5. The system according to claim 3, wherein said imaging system is configured for capturing stereoscopic image data.

6. The system according to claim 4, wherein said data processor is configured for calculating range data from said stereoscopic image data.

7. The system according to claim 5, wherein said data processor is configured for calculating range data from said stereoscopic image data.

8. The system according to claim 2, further comprising a light source configured for projecting a light beam onto said individual, wherein said data processor is configured for calculating range data by a time-of-flight technique.

9. The system according to claim 2, further comprising a light source configured for projecting a light pattern onto said individual, wherein said data processor system is configured for calculating range data by a technique selected from the group consisting of a triangulation technique and a structured light technique.

10. The system according to claim 1, wherein said stream of imagery data of said remote user comprises a video stream, and wherein said data processor is configured for reconstructing a three-dimensional image from said stream of imagery data and displaying said three-dimensional image on said display device.

11. The system according to claim 2, wherein said stream of imagery data of said remote user comprises a video stream, and wherein said data processor is configured for reconstructing a three-dimensional image from said stream of imagery data and displaying said three-dimensional image on said display device.

12. The system according to claim 1, wherein said variation of said view comprises varying a displayed orientation of said remote user oppositely to a change of said head orientation.

13. The system according to claim 2, wherein said variation of said view comprises varying a displayed orientation of said remote user oppositely to a change of said head orientation.

14. The system according to claim 1, wherein said variation of said view comprises maintaining a fixed orientation of said remote user relative to said head orientation.

15. The system according to claim 2, wherein said variation of said view comprises maintaining a fixed orientation of said remote user relative to said head orientation.

16. The system according to claim 1, further comprising at least one infrared light source constituted for illuminating at least a portion of said local scene, wherein said stream of imagery data of said individual comprises image data received from said individual in a visible range of wavelengths and in an infrared range of wavelengths.

17. The system according to claim 2, further comprising at least one infrared light source constituted for illuminating at least a portion of said local scene, wherein said stream of imagery data of said individual comprises image data received from said individual in a visible range of wavelengths and in an infrared range of wavelengths.

18. A system for at least two-way video conferencing between at least a first party at a first location and a second party at a second location, the system comprising, a first system at said first location and a second system at said second location, each of said first and said second systems being the system according to claim 1.

19. A method of video conferencing, comprising:
   receiving from a remote location a stream of imagery data of a remote user and displaying an image of said remote user on a display device;
   using an imaging system for capturing a stream of imagery data of an individual in a local scene in front of said display device; and
   using a data processor for extracting a head orientation of said individual, and varying a view of said image responsively to said head orientation;
   wherein said varying said view comprises varying a displayed orientation of said remote user such that a rate of change of said orientation matches a rate of change of said head orientation
   wherein said stream od imagery data comprises range data in a form of a depth map providing depth information at a lower resolution for a group of pixels of the image data.

20. The method according to claim 19, wherein said capturing said stream of imagery data comprises capturing a video stream and said range data.

21. The method according to claim 19, wherein said capturing said stream of imagery data comprises capturing stereoscopic image data.

22. The method according to claim 20, wherein said capturing said stream of imagery data comprises capturing stereoscopic image data.

23. The method according to claim 21, further comprising calculating range data from said stereoscopic image data.

24. The method according to claim 22, further comprising calculating range data from said stereoscopic image data.

25. The method according to claim 20, further comprising projecting a light beam onto said individual, and calculating said range data by a time-of-flight technique.

26. The method according to claim 20, further comprising projecting a light pattern onto said individual, and calculating said range data by a technique selected from the group consisting of a triangulation technique and a structured light technique.

27. The method according to claim 19, wherein said stream of imagery data of said remote user comprises a video stream, and the method comprises reconstructing a three-dimensional image from said stream of imagery data and displaying said three-dimensional image on said display device.

28. The method according to claim 20, wherein said stream of imagery data of said remote user comprises a video stream, and the method comprises reconstructing a three-dimensional image from said stream of imagery data and displaying said three-dimensional image on said display device.

29. The method according to claim 19, wherein said varying said view comprises varying a displayed orientation of said remote user oppositely to a change of said head orientation.

30. The method according to claim 20 wherein said varying said view comprises varying a displayed orientation of said remote user oppositely to a change of said head orientation.

31. The method according to claim 19, wherein said varying said view comprises maintaining a fixed orientation of said remote user relative to said head orientation.

32. The method according to claim 20, wherein said varying said view comprises maintaining a fixed orientation of said remote user relative to said head orientation.

33. The method according to claim 19, further comprising illuminating at least a portion of said local scene by infrared light, wherein said capturing said stream of imagery data of said individual comprises imaging said individual in a visible range of wavelengths and in an infrared range of wavelengths.

34. The method according to claim 20, further comprising illuminating at least a portion of said local scene by infrared light, wherein said capturing said stream of imagery data of said individual comprises imaging said individual in a visible range of wavelengths and in an infrared range of wavelengths.

35. A computer software product, comprising a non-transitory computer-readable medium in which program instructions are stored, which instructions, when read by a data processor, cause the data processor to receive a video stream of a remote user and a video stream of an individual in a local scene, and to execute the method according to claim 19.

36. The system of claim 1, further comprising extracting a gaze direction of said individual, and varying a view of said image responsively to said gaze direction.

37. The system of claim 36, wherein said variation of said view comprises varying a displayed orientation of said remote user such that a rate of change of said orientation matches a rate of change of said gaze direction.

38. The system according to claim 36, wherein said variation of said view comprises varying a displayed orientation of said remote user oppositely to a change of said gaze direction.

39. The method of claim 19, further comprising extracting a gaze direction of said individual, and varying a view of said image responsively to said gaze direction.

40. The method of claim 39, wherein said variation of said view comprises varying a displayed orientation of said remote user such that a rate of change of said orientation matches a rate of change of said gaze direction.

41. The system according to claim 39, wherein said variation of said view comprises varying a displayed orientation of said remote user oppositely to a change of said gaze direction.

\* \* \* \* \*